United States Patent
Kajio et al.

(10) Patent No.: US 8,732,911 B2
(45) Date of Patent: *May 27, 2014

(54) ASSIST GRIP

(75) Inventors: Hideki Kajio, Toyota (JP); Takahiro Sugiyama, Toyota (JP)

(73) Assignee: Howa Plastics Co., Ltd., Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,600

(22) Filed: Mar. 14, 2012

(65) Prior Publication Data

US 2012/0304418 A1  Dec. 6, 2012

(30) Foreign Application Priority Data

May 31, 2011  (JP) .................. 2011-122075

(51) Int. Cl.
*A45C 3/00* (2006.01)

(52) U.S. Cl.
USPC .......................................................... 16/438

(58) Field of Classification Search
USPC ......... 16/110.1, 412, 418, 429, 438, DIG. 24, 16/DIG. 25, DIG. 40–41, DIG. 43
See application file for complete search history.

(56) References Cited

U.S. PATENT DOCUMENTS

| | | | | |
|---|---|---|---|---|
| 6,363,577 B1 * | 4/2002 | Spitzley | ...................... | 292/336.3 |
| 6,578,236 B2 * | 6/2003 | Munari | ........................... | 16/444 |
| 6,969,100 B2 * | 11/2005 | Totani et al. | .................. | 296/1.02 |
| 7,300,089 B2 * | 11/2007 | Kuroda | ......................... | 296/39.1 |
| 7,415,751 B2 * | 8/2008 | Kato et al. | ........................ | 24/289 |
| 7,617,571 B2 * | 11/2009 | Lee et al. | ........................ | 16/412 |
| 8,146,208 B2 * | 4/2012 | Kajio et al. | ...................... | 16/444 |
| 8,210,588 B2 * | 7/2012 | Boehner et al. | ............... | 296/1.02 |
| 2003/0200634 A1 * | 10/2003 | Hansen | ............................ | 24/297 |
| 2003/0234549 A1 * | 12/2003 | Totani et al. | .................. | 296/1.02 |
| 2005/0116485 A1 * | 6/2005 | Kuroda | .......................... | 296/1.08 |
| 2007/0102944 A1 * | 5/2007 | Kato et al. | .................... | 296/1.02 |
| 2008/0018128 A1 * | 1/2008 | Yamagiwa et al. | .......... | 296/1.02 |
| 2008/0098563 A1 * | 5/2008 | Lee et al. | ...................... | 16/110.1 |
| 2011/0214255 A1 * | 9/2011 | Kajio et al. | ....................... | 16/429 |

FOREIGN PATENT DOCUMENTS

JP  2009121633 A  6/2009

* cited by examiner

*Primary Examiner* — Roberta Delisle

(74) *Attorney, Agent, or Firm* — Ingrassia Fisher & Lorenz, P.C.

(57) ABSTRACT

An assist grip of the present invention includes, but is not limited to, a grip body including hinge cavities on opposite bases and hinge assemblies pivotally supported inside the hinge cavities at opposite sides, respectively, and secured to mounting locations inside a vehicle via the hinge assemblies. Mounting clips are inserted into rectangular openings of hinge bodies of the hinge assemblies, respectively. Each of the mounting clips is formed by bending a pair of resilient legs having spring resiliency into a substantially U-shape, and includes resilient bulging portions bulging outward in the resilient legs at both sides. Each of the resilient bulging portions includes a retention portion to be retained by a mounting location of a vehicle body. The retention portion of the resilient bulging portion includes a recess portion that is recessed inward and provided with an extended region in a pull-out direction of the mounting clip.

9 Claims, 17 Drawing Sheets

ASSIST GRIP

CROSS-REFERENCES TO RELATED APPLICATIONS

This application claims priority to Japanese Patent Application Serial No. 2011-122075, filed May 31, 2011.

TECHNICAL FIELD

The technical field relates to an assist grip to be mounted on a ceiling surface or the like inside a vehicle compartment, and more particularly, to an assist grip a grip body of which is secured to a mounting location inside the vehicle in a rotatable fashion via a hinge assembly.

BACKGROUND

Assist grips are installed on a ceiling surface inside a vehicle compartment to provide a support for vehicle occupants in the compartment. This kind of assist grips having such a structure that cavities are formed at opposite sides of a grip body and hinge assemblies are installed in cavities in a rotatable fashion, and the grip body is rotatably mounted via the hinge assemblies have been used in various automobiles.

As disclosed in, for example, JP2009-121633 A, this assist grip includes hinge assemblies at opposite sides thereof mounting clips made of metal, and is mounted by the mounting clips so as to be secured to a body panel of a vehicle body. This mounting clip is formed of a metal having spring resiliency into a substantially U-shape, and fitted into a hinge body so as to cover a center support plate of the hinge body of the hinge assembly. For mounting on the vehicle body, there is a structure of fitting the mounting clips into rectangular holes formed on the body panel of the vehicle body to engage engaging portions of bulging portions provided at both sides of each of the mounting clips with the periphery of the rectangular hole of the body panel, for securing the assist grip to the vehicle body.

Meanwhile, the assist grip is demounted from the vehicle body in some cases such as repair of the vehicle body. For demounting the assist grip from the vehicle body, covers are removed from the hinge bodies at opposite sides, resilient legs at both sides of each of the mounting clips fitted inside the hinge body are flexed inward, and engaging pawls provided in the bulging portions at intermediate positions are flexed inward. Thereby, the engaging pawls of the mounting clip are disengaged from the periphery of the rectangular hole, the mounting clip is pulled out of the rectangular hole, and then the hinge bodies at opposite sides are removed from the vehicle body to demount the assist grip from the vehicle body.

However, in the mounting clips used for the conventional assist grip, as described in the above Patent Document (JP2009-121633A), the engaging pawls provided in the bulging portions bulging at both sides of an intermediate portion of each of the mounting clips are relatively short, and bent in substantially laid V-shapes, and the laid V-shaped engaging pawls are engaged with the periphery of the rectangular hole formed on the body panel. Therefore, when the mounting clips are removed, an operator uses a tool or the like for each mounting clip located inside of the hinge body to flex the engaging pawls of the bulging portions in such a manner as to pinch them from both sides for removal, but since the engaging pawls are short, the operator cannot easily observe the engaging pawls in the hinge body, and a tool or the like does not easily catch thereon. Accordingly, it is difficult to demount the assist grip from the body panel, and there has been a problem in demounting workability of the assist grip.

In view of the foregoing, it is an object to provide an assist grip which allows easy removal of the mounting clips from the hinge bodies secured to a body panel of a vehicle body for simple demounting of the hinge bodies from the body panel in the case of repair and the like. In addition, other objects, desirable features, and characteristics will become apparent from the subsequent summary and detailed description, and the appended claims, taken in conjunction with the accompanying drawings and this background.

SUMMARY

An assist grip of an embodiment includes a grip body including hinge cavities on bases provided at opposite left and right ends, hinge assemblies including a pair of hinge bodies to be pivotally connected to the hinge cavities at opposite sides via pivot shafts, and mounting clips to be respectively inserted into rectangular openings provided in the pair of hinge bodies, and each of the mounting clips is formed by bending a pair of resilient legs having spring resiliency into a substantially U-shape, and includes resilient bulging portions bulging outward in the resilient legs at both sides. Each of the resilient bulging portions includes a retention portion to be retained by a mounting location of a vehicle body, and in the vicinity of a leading end of the resilient leg, a stepped region to be retained is provided by an inner peripheral region of the rectangular opening of the hinge body. In the assist grip, the retention portion of the resilient bulging portion includes a recess portion that is recessed inward and provided with an extended region in a pull-out direction of the mounting clip.

According to an embodiment, since the recess portions with extended regions are provided in the retention portions of the resilient bulging portions provided at both sides of the mounting clip, the extended regions make the retention portions longer in length than laid V-shaped retention portions in prior designs of the mounting clip. Accordingly, in the case of demounting the assist grip from the body panel for repair and the like, the retention portions of the mounting clip can be easily observed by an operator when the cover is removed from the hinge body.

Accordingly, when flexing the resilient legs at both sides inward and flexing the resilient bulging portions at intermediate positions inward in order to demount the mounting clip, the operator can easily catch a tool or the like on the leading ends of the retention portions. Thus, when demounting the assist grip, the operator can easily flex the resilient bulging portions inward to disengage the retention portions of the mounting clip from the periphery of the rectangular hole of the body panel, and easily remove the hinge body of the assist grip from the vehicle body.

Here, it is preferable that each of the resilient bulging portions provided at both sides of the mounting clip includes short retaining pawls provided in a projecting manner in parallel to a plane of the resilient bulging portion on both sides of the retention portion, and the retaining pawls of the resilient bulging portion, when the assist grip is mounted on a vehicle body, can be retained by an inner side of a mounting location of the vehicle body.

According to an embodiment, the retaining pawls and the recess portions of the retention portions of the resilient bulging portions provided at both sides of the mounting clip are retained by a mounting location, so that the hinge body of the assist grip can be more tightly secured to a mounting location of the body panel and the like without rattling.

It is also preferable that the stepped region of the resilient leg is formed by being bent into substantially a crank shape, the stepped region includes at a leading end side a projecting portion divided into three regions, the projecting portion at the center is provided as a retaining pawl so as to project outward in an inclined manner, and the retaining pawl of the resilient leg, when the mounting clip is inserted into the hinge body, can be retained by a holding region of the hinge body.

According to an embodiment, when pushing the mounting clip into the rectangular hole of the body panel and securing the hinge body to a mounting location, reaction force when the mounting clip is pushed in acts on the resilient legs, whereas the retaining pawls of the resilient legs are held by a part of the hinge body in a stable manner, so that the reaction force when the mounting clip is pushed in is securely retained at a predetermined position by the retaining pawls, and unevenness in the mounting position of the mounting clip onto the body panel can be reduced.

As has been described, the assist grip allows easy removal of the mounting clips from the hinge bodies secured to a body panel of a vehicle body for simple demounting of the hinge bodies from the body panel in the case such as repair.

BRIEF DESCRIPTION OF DRAWINGS

The embodiments will hereinafter be described in conjunction with the following drawing figures, wherein like numerals denote like elements, and.

DETAILED DESCRIPTION

Figure 1:
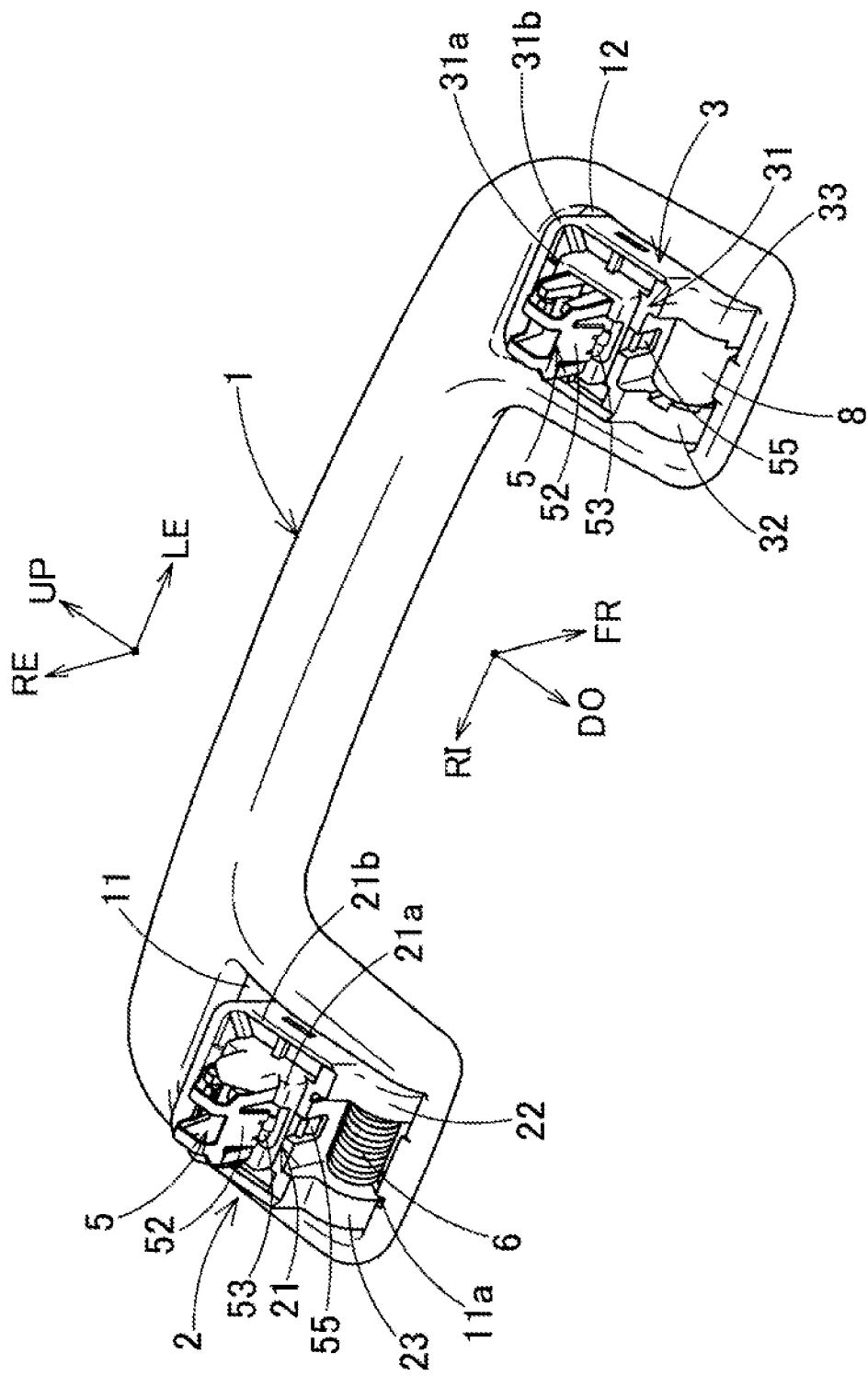
FIG. 1 is a perspective view of an assist grip as viewed from the back showing an embodiment.

Hereinafter, the present invention will be described based on embodiments shown in the drawings. However, the present invention is by no means limited to the embodiments. All modifications within the requirements of the claims or equivalents thereof with respect to the requirements should be included in the scope of the claims.

Figure 2:
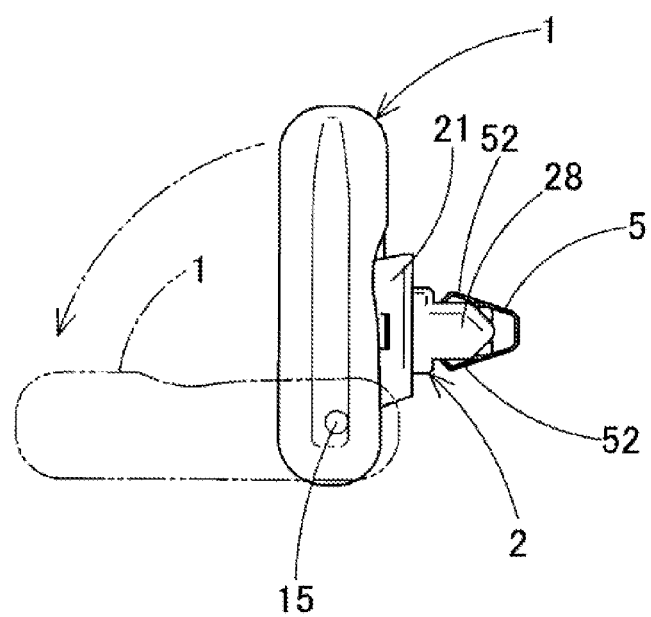
FIG. 2 is a right side view of the assist grip.
Figure 3:
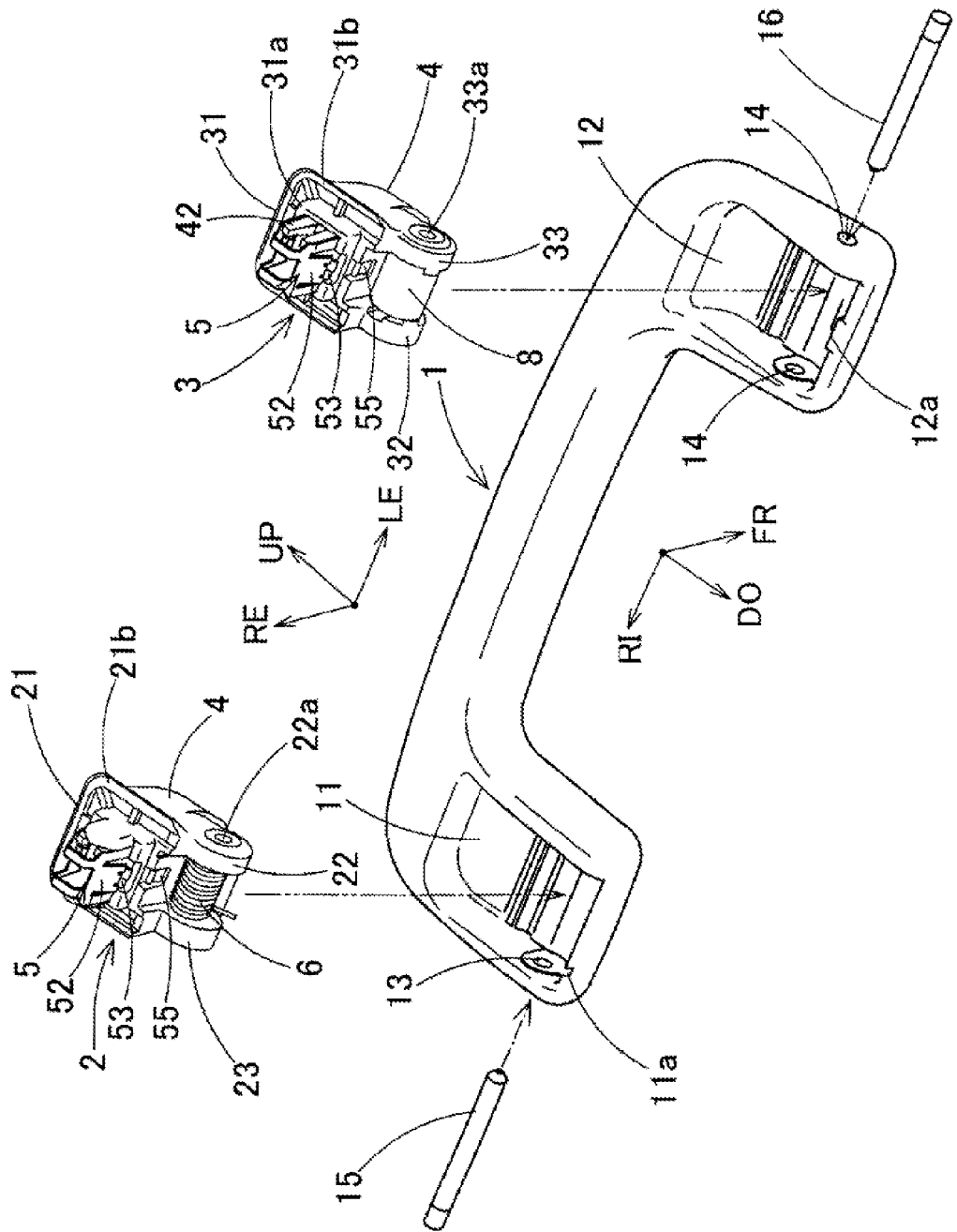
FIG. 3 is an exploded perspective view of the assist grip as viewed from the back.

FIG. 1 shows a perspective view of an assist grip as viewed from the back, FIG. 2 shows a right side view thereof, and FIG. 3 shows an exploded perspective view thereof. In addition, left, right, up, and down to be used in the following description refer to left, right, up, and down of an assist grip in a mounted posture as viewed from the front, and "FR," "LE," "RI," "UP," "RE," and "DO" used in the illustration refer to front, left, right, up, rear, and down, respectively.

First, to describe a schematic configuration of the assist grip, in FIG. 1 to FIG. 3, reference numeral 1 denotes a grip body integrally molded of a synthetic resin, and the grip body 1 includes on the back of bases provided at opposite left and right ends thereof substantially rectangular hinge cavities 11, 12, respectively. At both left and right side wall portions inside the hinge cavities 11, 12 located at opposite sides, shaft holes 13, 14 are formed, respectively, and pivot shafts 15, 16 are respectively inserted through the shaft holes 13, 14 on the side wall portions as well as shaft holes 22a and 23a, 32a and 33a provided on inner supports 22, 32 and outer supports 23, 33 of hinge assemblies 2, 3, respectively, so that the respective hinge assemblies 2, 3 are pivotally supported relative to the grip body 1. A pair of the hinge assemblies 2, 3 is secured to a vehicle body of an automobile, and the grip body 1 is made rotatable between a non-use state and an in-use state relative to the hinge assemblies 2, 3.

Figure 4:
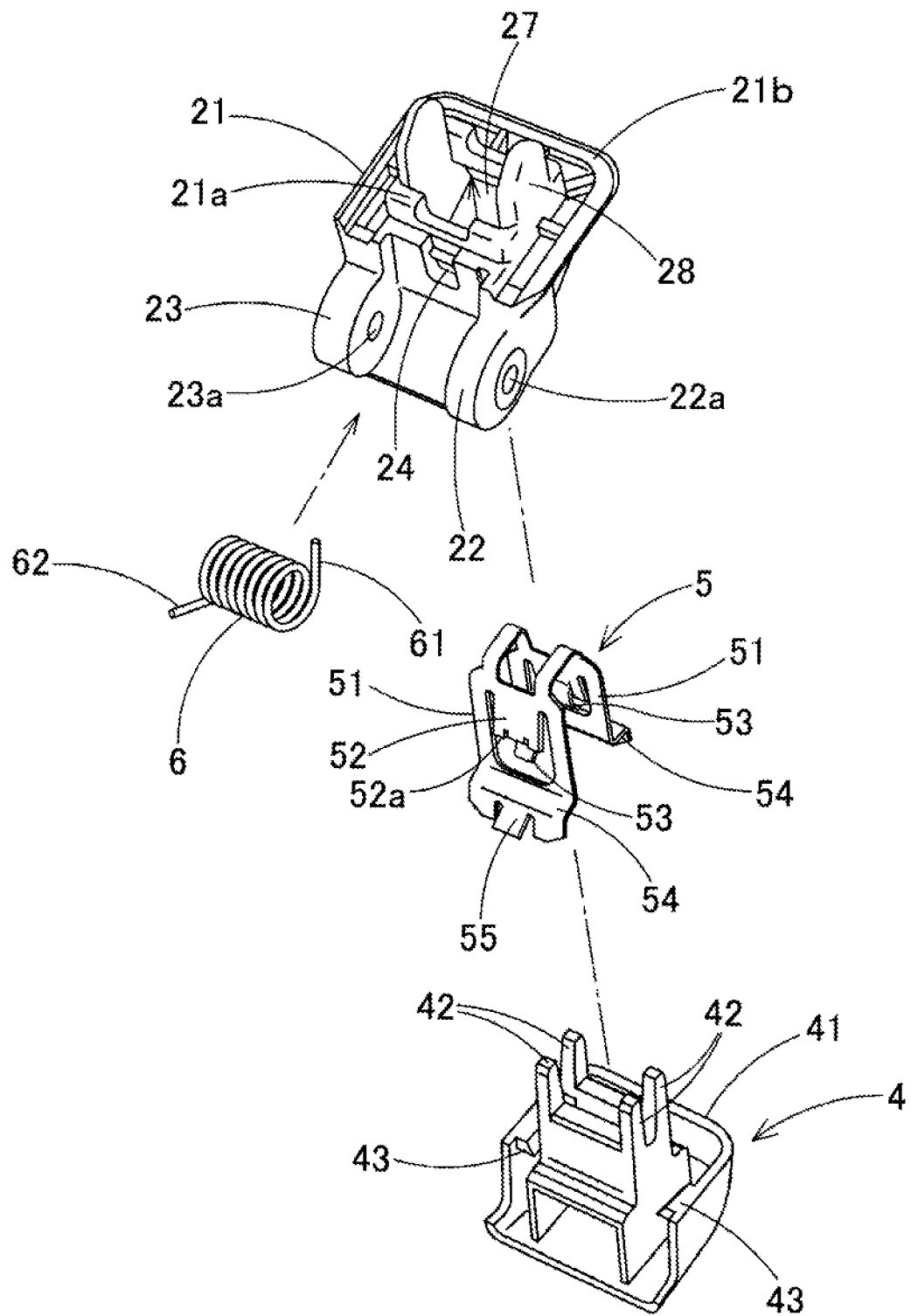
FIG. 4 is an exploded perspective view of a right hinge assembly 2 as viewed from the back.
Figure 5:
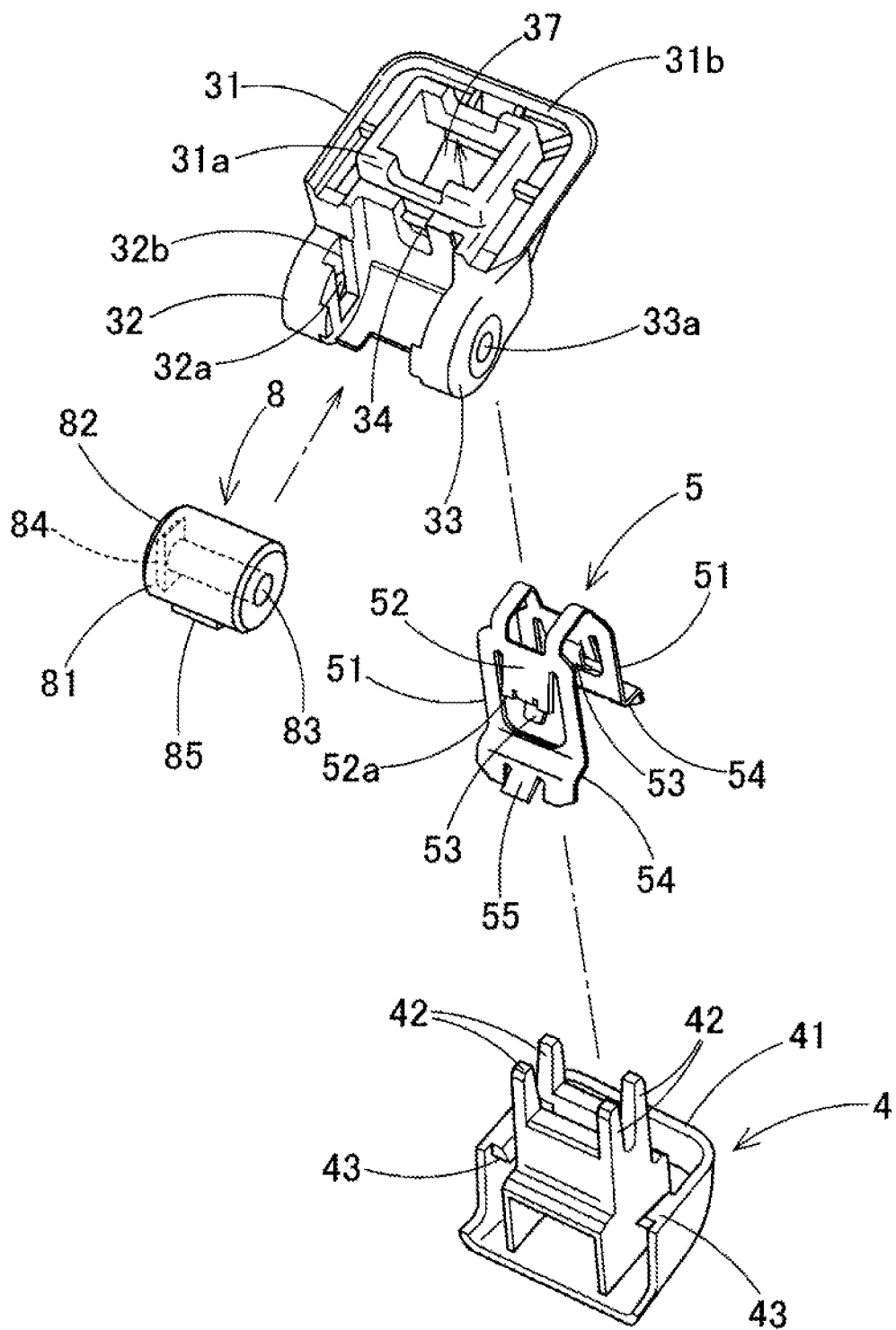
FIG. 5 is an exploded perspective view of a left hinge assembly 3 as viewed from the back.

As shown in FIG. 3, FIG. 4, and FIG. 5, the right hinge assembly 2 includes a hinge body 21, a mounting clip 5 that is mounted by being fitted into the hinge body 21 from its front side, and inserted and engaged with a rectangular hole on a vehicle body panel, a cover 4 that is fitted to the hinge body 21 so as to cover its front side and makes a clip support portion 42 enter into a rectangular opening 27 in the hinge body 21 to support the mounting clip 5 from inside, and a torsion coil spring 6 that is installed between the inner support 22 and the outer support 23 provided in a projecting manner at a lower portion of the hinge body 21.

Similarly, the left hinge assembly 3 includes a hinge body 31, a mounting clip 5 that is mounted by being fitted into the hinge body 31 from the front side, and inserted and engaged with a rectangular hole on a vehicle body panel, a cover 4 that is fitted to the hinge body 31 so as to cover its front side and makes a clip support portion 42 enter into a rectangular opening 37 in the hinge body 31 to support the mounting clip 5 from inside, and an oil damper 8 that is inserted between the inner support 32 and the outer support 33 provided in a projecting manner at a lower portion of the hinge body 31, and applies a rotational load to the grip body 1.

The hinge body 21 of the right hinge assembly 2 is, as shown in FIG. 4, FIG. 6A to FIG. 6C, and FIG. 7A and FIG. 7B, formed into a cubic shape that is substantially quadrate in front view, and integrally molded of a synthetic resin with the inner support 22 and the outer support 23 provided in a projecting manner at a lower portion thereof. The hinge body 21 includes between the inner support 22 and the outer support 23 a space for the torsion coil spring 6, and a rectangular opening 27 is provided substantially at a central part of the hinge body 21. The hinge body 21 further includes at the back side of the rectangular opening 27 a rectangular frame 21a provided in a projecting manner, and a seat portion 21b formed at a part around and one step lower than the rectangular frame 21a, for inserting the rectangular frame 21a into the rectangular hole of the body panel and abutting the seat portion 21b against the surface of the body panel when fitting the hinge body 21 into the rectangular hole.

The inner support 22 and the outer support 23 provided in a projecting manner at the lower side of the hinge body 21 include shaft holes 22a, 23a formed as through-holes, respectively. There is a structure where a pivot shaft 15 is inserted through the shaft holes 22a, 23a (FIG. 3), for pivotally supporting the hinge body 21 inside the hinge cavity 11 of the grip body 1. As in FIG. 6A to FIG. 6C and FIG. 7A and FIG. 7B, the hinge body 21 is formed at both sides with cover engaging portions 29, with which engaging pawls 43 provided at the inner side of the cover 4 are engaged when the cover 4 is fitted to the front side of the hinge body 21 as described below. Moreover, the rectangular opening 27 formed substantially at a central portion of the hinge body 21 is, as shown in FIG. 5, formed in a shape to allow insertion of the mounting clip 5 to be described later from its back side, and is formed in a shape to allow insertion of the clip support portion 42 provided in a projecting manner on the back side of the cover 4 when the cover 4 is fitted.

Figure 6A:
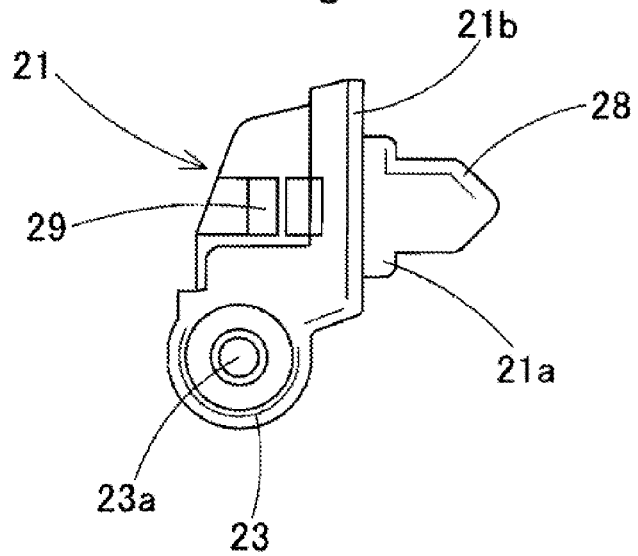
FIG. 6A is a right side view of a hinge body 21 of the hinge assembly 2.
Figure 6B:
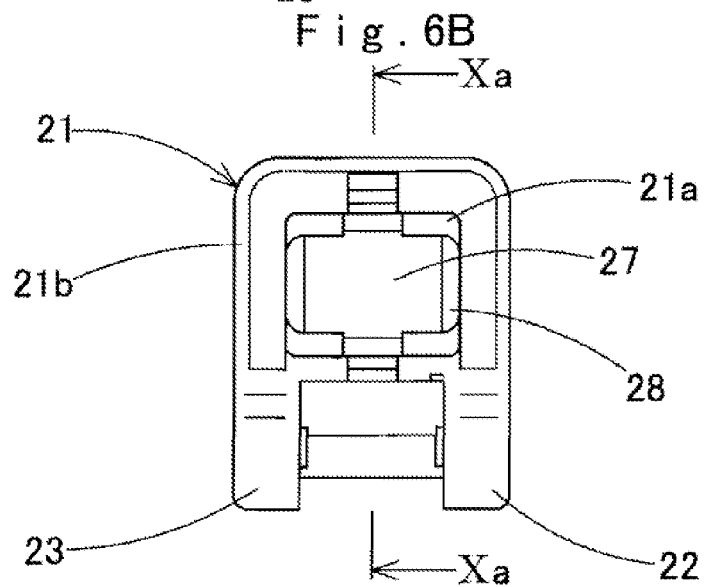
FIG. 6B is a rear view of the hinge body 21.
Figure 6C:
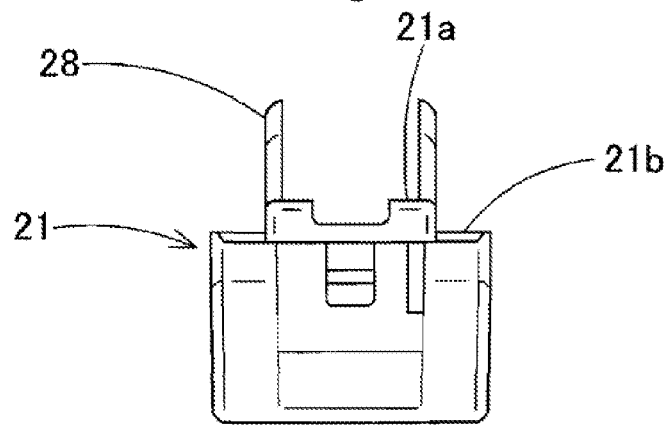
FIG. 6C is a plan view of the hinge body.
Figure 7A:
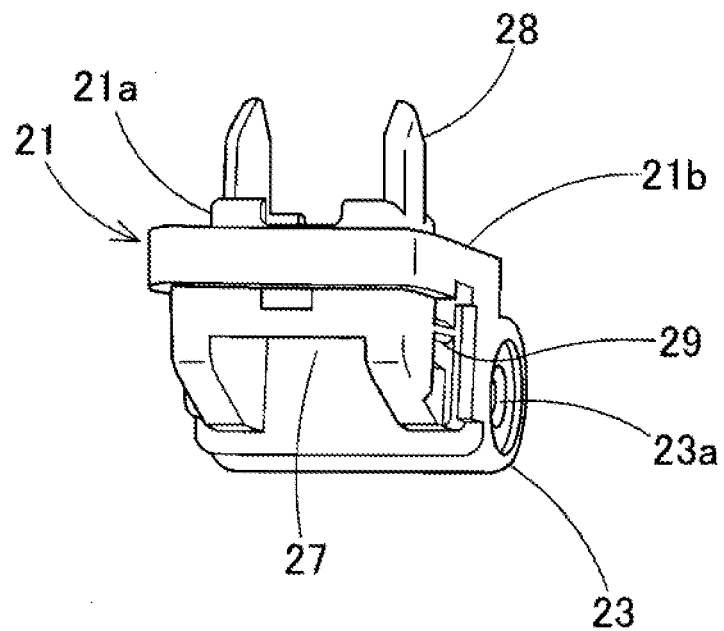
FIG. 7A is a perspective view of the hinge body 21 as viewed from upper front.
Figure 7B:
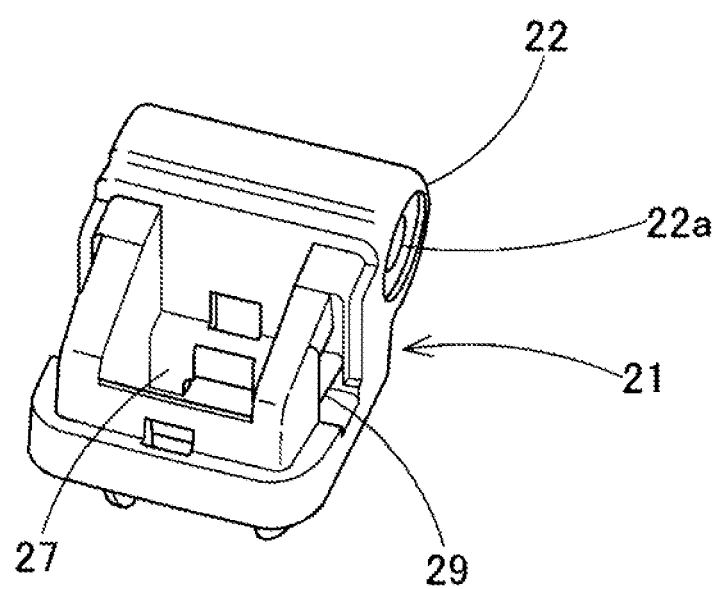
FIG. 7B is a perspective view of the hinge body 21 as viewed from a different angle.
Figure 8A:
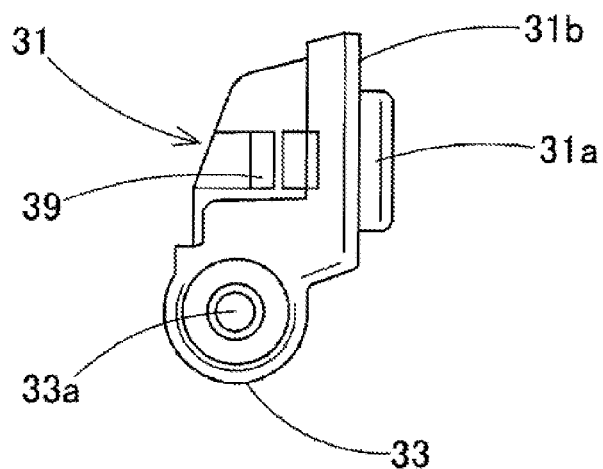
FIG. 8A is a right side view of a hinge body 31 of the hinge assembly 3.
Figure 8B:
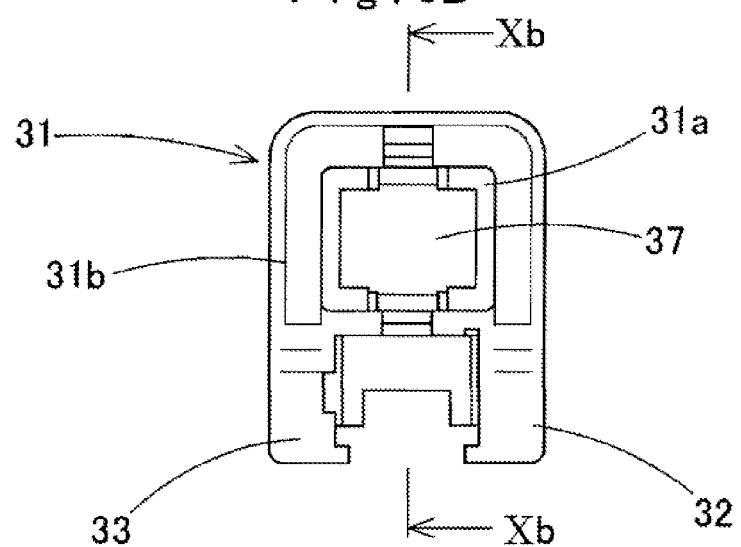
FIG. 8B is a rear view of the hinge body 31.
Figure 8C:
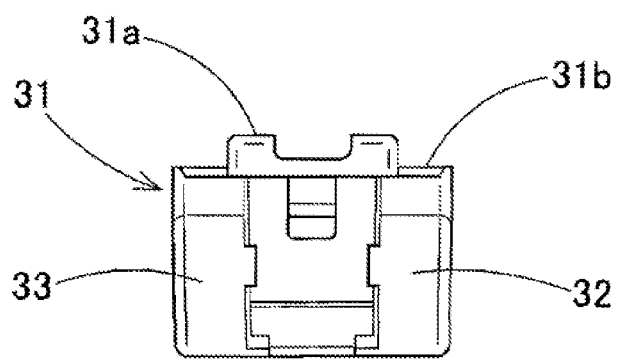
FIG. 8C is a plan view of the hinge body.
Figure 9A:
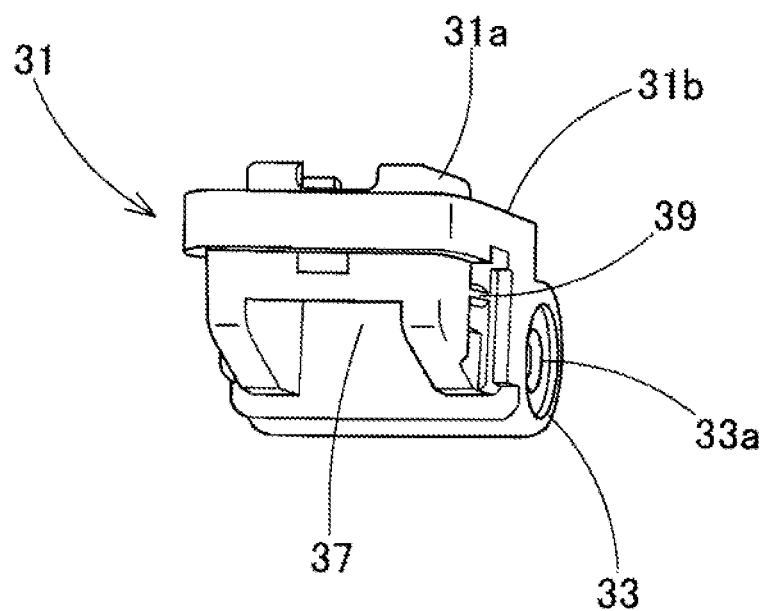
FIG. 9A is a perspective view of the hinge body 31 as viewed from upper front.
Figure 9B:
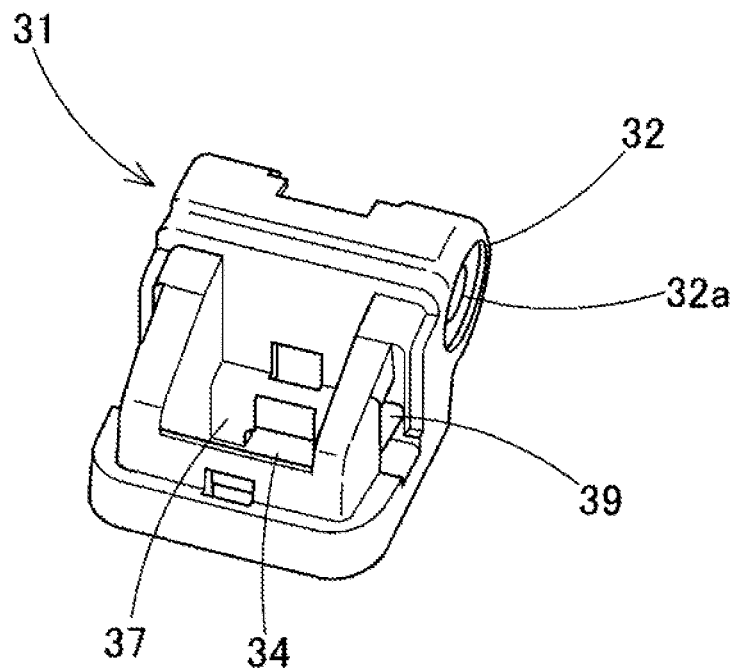
FIG. 9B is a perspective view of the hinge body 31 as viewed from a different angle.
Figure 10A:
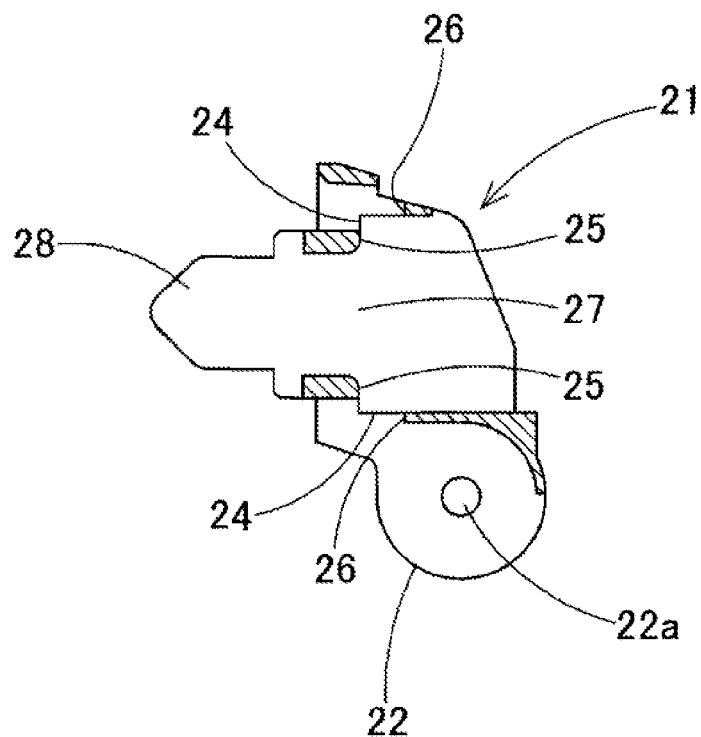
FIG. 10A is a sectional view taken along line Xa-Xa of FIG. 6B.

As shown in FIG. 10A, the hinge body 21 further includes at both inner sides of the rectangular opening 27 inner peripheral regions 25 provided projecting inward, in order to retain stepped regions 54 of the mounting clip 5 to be described later. Moreover, holes 24 are formed at the front side of the inner peripheral regions 25, and holding regions 26 are formed at the front side of the holes 24 and at both inner sides of the rectangular opening 27 so as to hold retaining pawls 55 of the mounting clip 5. In addition, as shown in FIG. 6A to FIG. 6C, etc., the hinge body 21 includes at both sides of the rectangular opening 27 projections 28 provided projecting to the back side, so that when the hinge body 21 is fitted into the rectangular hole of the body panel for assembly, the outer surfaces of the projections 28 contact both left and right edges of the rectangular hole to prevent the hinge body and the grip body 1 from rattling in a left and right direction.

As shown in FIG. 3, FIG. 5, and FIG. 8A to FIG. 8C, almost similar to the right hinge body 21 described above, the hinge body 31 of the left hinge assembly 3 is formed into a cubic shape that is substantially quadrate in front view, and integrally molded of a synthetic resin with the inner support 32 and the outer support 33 provided in a projecting manner at a lower portion thereof. The hinge body 31 includes, between the inner support 32 and the outer support 33, a space for the oil damper 8 and a rectangular opening 37 is provided substantially at a central part of the hinge body 31. The hinge body 31 further includes at the back side of the rectangular opening 37 a rectangular frame 31a provided in a projecting manner, and a seat portion 31b formed at a part around and one step lower than the rectangular frame 31a, for inserting the rectangular frame 31a into the rectangular hole of the body panel so as to abut the seat portion 31b against the surface of the body panel when fitting the hinge body 31 into the rectangular hole.

As shown in FIG. 3, FIG. 5, and FIG. 8A to FIG. 8C, the inner support 32 and the outer support 33 provided in a projecting manner at the lower portion of the hinge body 31 include shaft holes 32a, 33a formed as through-holes, respectively. This is a structure where a pivot shaft 16 is inserted through the shaft holes 32a, 33a, for pivotally supporting the hinge body 31 inside the hinge cavity 12 of the grip body 1. As in FIG. 8A to FIG. 8C and FIG. 9A and FIG. 9B, the hinge body 31 is formed at both sides with cover engaging portions 39, with which engaging pawls 43 on the cover 4 are engaged when the cover 4 is fitted to the front side of the hinge body 31. Moreover, the rectangular opening 37 formed substantially at a central portion of the hinge body 31 is, as shown in FIG. 5, formed in a shape to allow insertion of the mounting clip 5 from its back side, and is formed in a shape to allow insertion of the clip support portion 42 provided in a projecting manner on the back side of the cover 4 when the cover 4 is fitted.

Figure 10B:
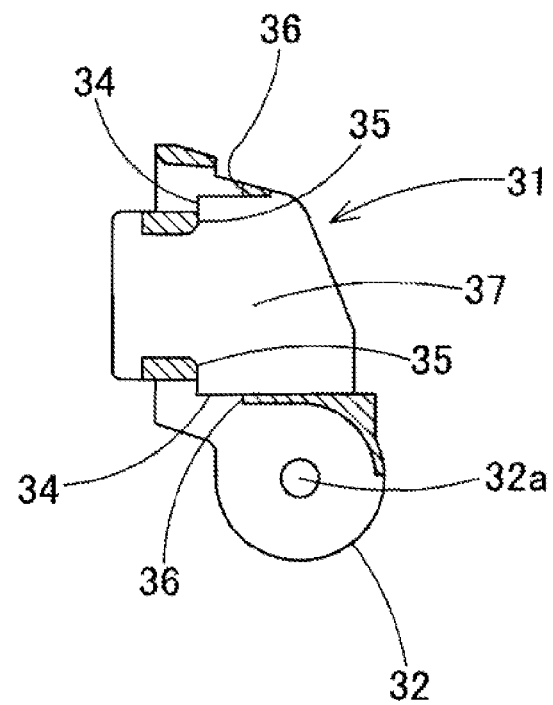
FIG. 10B is a sectional view taken along line Xb-Xb of FIG. 8B.
Figure 11A:
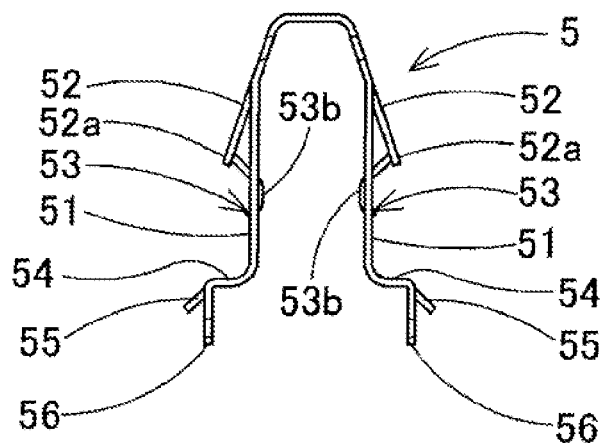
FIG. 11A is a side view of a mounting clip.
Figure 11B:
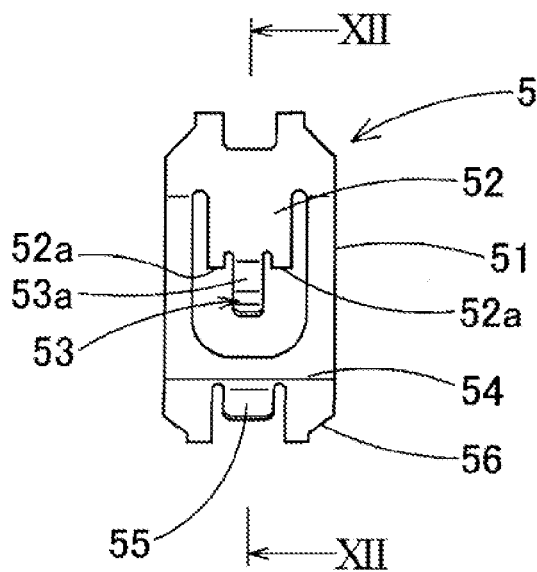
FIG. 11B is a plan view of the mounting clip.
Figure 11C:
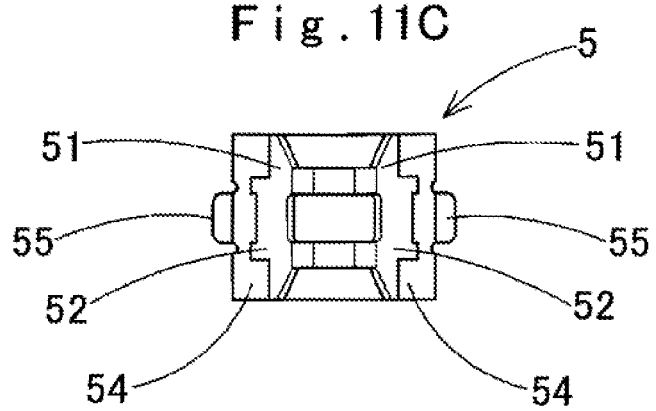
FIG. 11C is a rear view of the mounting clip.

As shown in FIG. 10B, the hinge body 31 further includes at both inner sides of the rectangular opening 37 inner peripheral regions 35 provided projecting inward by which stepped regions 54 of the mounting clip 5 are retained. Moreover, holes 34 are formed at the front side of the inner peripheral regions 35, and holding regions 36 are formed at the front side of the holes 34 and at both inner sides of the rectangular opening 37 so as to hold retaining pawls 55 of the mounting clip 5.

As shown in FIG. 6A to FIG. 6C to FIG. 9A and FIG. 9B, unlike conventional hinge bodies, the hinge bodies 21, 31 have a structure without center support plates provided in the rectangular openings 27, 37, but having the whole openings open, which thus allows simplifying the structure of a mold for the hinge bodies 21, 31, thereby allowing reducing the manufacturing cost.

Then, the mounting clips 5 as main portions of the present invention will be described. The mounting clips 5 are inserted and fitted from the front side into the rectangular openings 27, 37 of the hinge bodies 21, 31, respectively, and the mounting clips 5 to be fitted into the hinge bodies 21, 31 provided at opposite left and right sides are the same in structure. The mounting clip 5 is formed, as shown in FIG. 11A to FIG. 11C and FIG. 12, by bending a metal having spring resiliency into a substantially U-shape, and includes at both sides resilient legs 51 having spring resiliency.

Each of the resilient legs 51 at both sides includes a resilient bulging portion 52 that is formed by cutting and raising outward a part of the inner region of the leg 51 so as to project. Each of the resilient bulging portions 52 at both sides is formed in an elastically deformable manner so as to project outward relative to the resilient leg 51, and the leading end of the resilient bulging portion 52 is divided into three regions, and includes at both sides retaining pawls 52a, 52a formed with their leading end portions cut straight. The resilient bulging portions 52 at both sides include single long retention portions 53, 53 formed at the centers in the vicinity of the leading ends and bent inward, respectively. That is, on both sides of the retention portion 53 of the resilient bulging portion 52, the retaining pawls 52a, 52a are provided in a projecting manner so as to project shorter in parallel to the plane of the resilient bulging portion 52.

Figure 12:
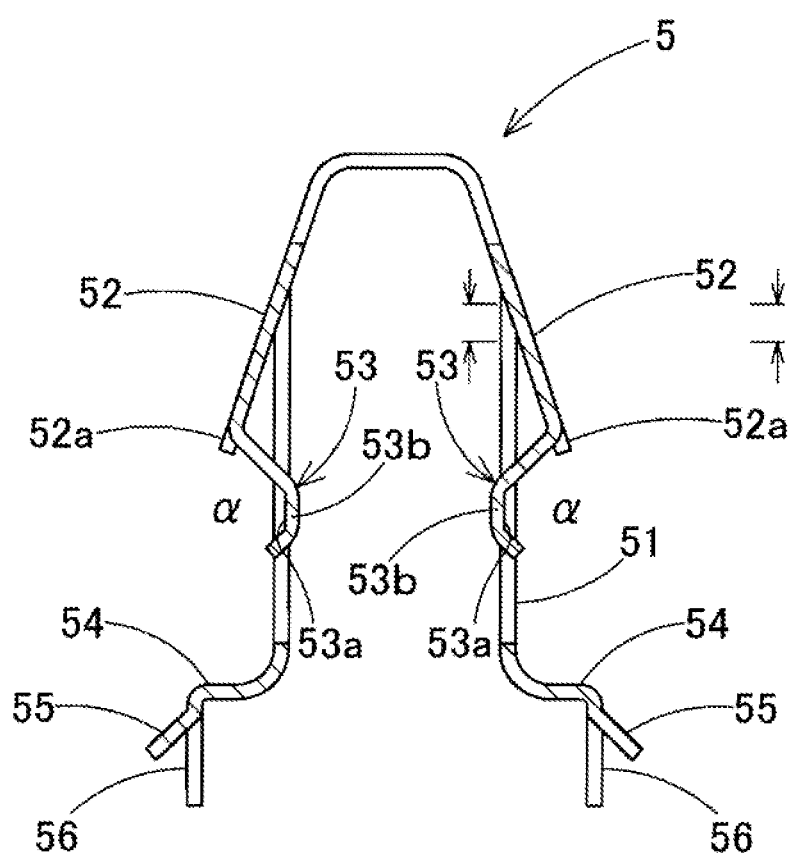
FIG. 12 is an enlarged sectional view of the mounting clip taken along line XII-XII of FIG. 11B.

Each of the retention portions 53 at both sides is a part, when the mounting clip 5 is inserted into the rectangular hole of the vehicle body panel to serve as a mounting location, to be retained by the periphery of the rectangular hole, and the retention portion 53 includes, as shown in FIG. 12, a recess portion 53a that is recessed inward and provided with an extended region 53b parallel to a pull-out direction of the mounting clip 5. The extended region 53b is formed in a manner to extend toward the leading end with a length a so that, when removing the mounting clip 5 from the hinge body 21, 31, the retention portion 53 can be easily observed from the front of the hinge body 21, 31, and a tool or the like can easily catch thereon. The retaining pawls 52a, 52a at both sides can be retained inside of the body panel when the mounting clip 5 is inserted into the rectangular hole of the body panel.

Figure 13:
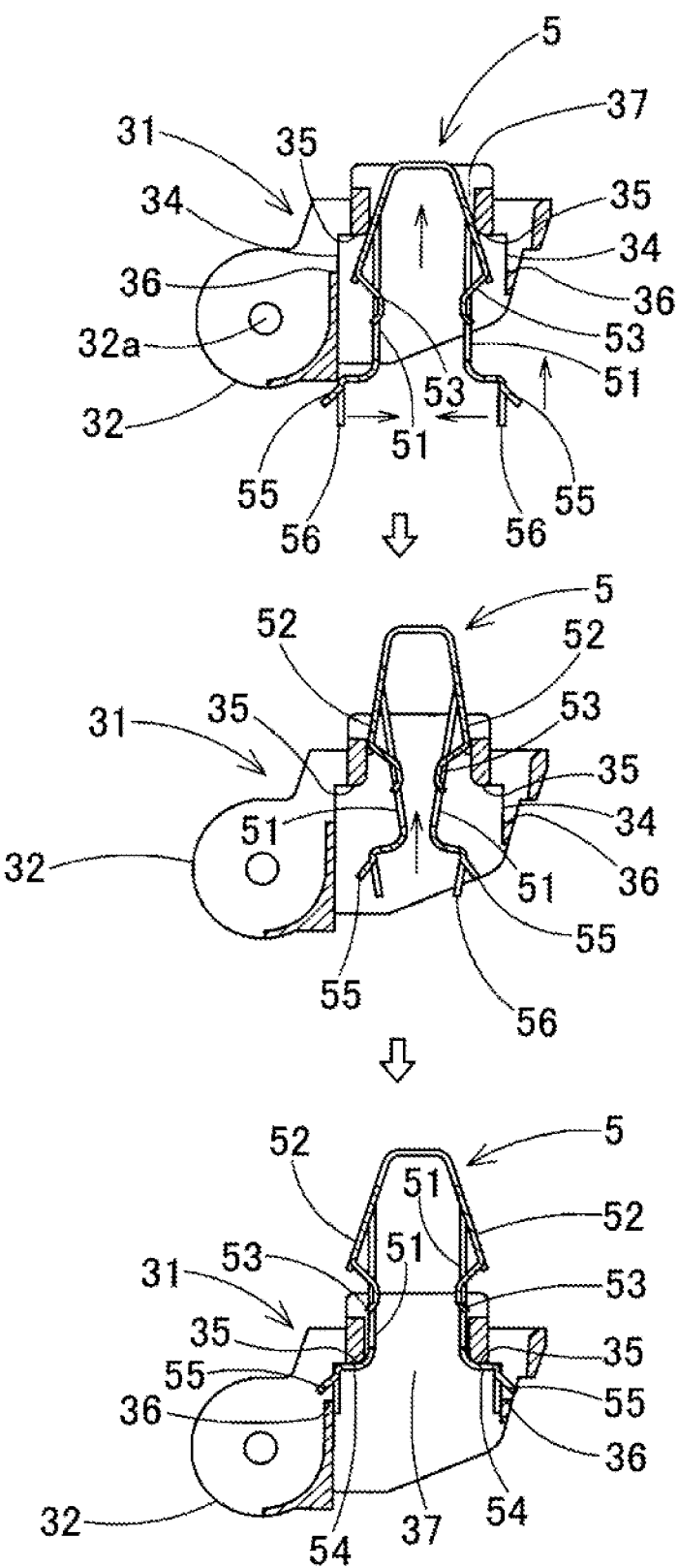
FIG. 13 is a diagram illustrating the insertion of the mounting clip into the hinge body of the hinge assembly by sectional views.

As shown in FIG. 11A to FIG. 11C and FIG. 12, each of the resilient legs 51 at both sides of the mounting clip 5 further includes a stepped region 54 formed in the vicinity of the leading end and bent substantially perpendicular to the leg, and includes at the leading end side of the stepped region 54 a projecting portion 56 provided in a projecting manner substantially in parallel to the inserting direction of the mounting clip 5, that is, substantially in parallel to the resilient leg 51 and divided into three regions, which defines a leading end portion. The projecting portion 56 includes a central part as a retaining pawl 55 formed by being cut and raised so as to project outward in an inclined manner. As shown in FIG. 13, when assembling the mounting clip 5 to the hinge body 31, the head of the mounting clip 5 is inserted into the rectangular opening 37 of the hinge body 31 from the front side, and the mounting clip 5 is then pushed up to the insertion end, and at this time, the stepped regions 54 at both sides of the mounting clip 5 are retained by the inner peripheral regions 35 provided at both sides of the rectangular opening 37, and the retaining pawls 55 at both sides enter the holes 34 at both sides in the rectangular opening 37 of the hinge body 31, to be held by the holding regions 36 formed at the front side of the holes 34.

FIG. 13 illustrates a state of assembling of the mounting clip 5 into the hinge body 31 of the left hinge assembly 3, and illustration of the hinge body 21 of the right hinge assembly 2 is omitted, but as shown in FIG. 10A, similarly in terms also of the hinge body 21 of the right hinge assembly 2, holes 24 are formed at both sides in the rectangular opening 27 of the hinge body 21, and the stepped regions 54 of the mounting clip 5 are retained by the inner peripheral regions 25 of the holes 24. Moreover, the hinge body 21 includes holding regions 26 formed at the front side of the holes 24, so that when the mounting clip 5 is inserted into the rectangular opening 27 of the hinge body 21 from the front side, the retaining pawls 55 of the mounting clip 5 are held by the holding regions 26.

The covers 4 are assembled to the front side of the hinge bodies 21, 31 so as to cover the front of the hinge bodies 21, 31, respectively. As shown in FIG. 4 and FIG. 5, each of the covers 4 includes a main cover body 41 that covers the front of the hinge body 21, 31, and a clip support portion 42 provided in a projecting manner on the back side of the main cover body 41, and the clip support portion 42 includes two pairs of steeple heads for fitting into an interior of the mounting clip 5, and the main cover body 41 is provided at both inner sides with engaging pawls 43 to be retained by the cover engaging portions 29, 39 provided at both sides of the hinge body 21, 31.

A torsion coil spring 6 for biasing the grip body 1 to a non-use position (state indicated by solid lines in FIG. 2) relative to the hinge assemblies 2, 3 is set between the inner support 22 and the outer support 23 of the hinge body 21 placed in the right hinge cavity 11. As shown in FIG. 4, the torsion coil spring 6 includes a first end segment 61 and a second end segment 62, and the first end segment 61 is, when the torsion coil spring 6 is set, retained in the vicinity of the inner side of the inner support 22 of the hinge body 21, and the second end segment 62 of the torsion coil spring 6 is held in a holding recess 11a formed in the hinge cavity 11 of the grip body 1. The torsion coil spring 6 is thus disposed between the outer support 23 and the inner support 22 of the hinge cavity 11 so as to bias the grip body 1 into a non-use state relative to the hinge body 21. As shown in FIG. 3 and FIG. 5, an oil damper 8 is set between the inner support 32 and the outer support 33 of the hinge body 31 placed in the left hinge cavity 12. The oil damper 8 includes a cylindrical inner tube 82 and an outer tube 81 attached around the inner tube 82 in a rotatable manner, and a void space formed between the inner tube 82 and the outer tube 81 is filled with oil, so that a braking force is produced by viscosity resistance of the oil when the inner tube 82 and the outer tube 81 rotate relative to each other.

The oil damper 8 includes a shaft hole 83 formed at the axial center position of the inner tube 82, and the pivot shaft 16 is inserted through the shaft hole 83 as shown in FIG. 3. Moreover, as shown in FIG. 5, an oblong boss 84 is provided projecting at a leading-end pivoting position of the inner tube 82, so that when the oil damper 8 is inserted between the inner support 32 and the outer support 33 of the hinge body 31, the oblong boss 84 is fitted in an oblong boss recessed region 32b formed at the inner side of the inner support 32.

On the other hand, the oil damper 8 is provided at an outer circumference of the outer tube 81 with a linear protrusion 85 in a projecting manner, so that when the oil damper 8 is inserted between the inner support 32 and the outer support 33 of the hinge body 31, the linear protrusion 85 is engaged with a linear protrusion engaging portion 12a (FIG. 3) provided inside the hinge cavity 12, and when the grip body 1 is operated to rotate, the outer tube 81 of the oil damper 8 rotates together with the grip body 1. Since the hinge assembly 3 is secured to the vehicle body panel side, and the inner tube 82 of the oil damper 8 is held at the oblong boss 84 of its end portion by the inner support 32, the inner tube 82 of the oil damper 8 rotates relative to the outer tube 81 when the grip body 1 is rotated about the hinge assembly 3, so as to exert an appropriate rotational resistance.

For assembling the assist grip, first, the mounting clips 5 are assembled to the hinge bodies 21, 31 at both sides, respectively. The mounting clips 5 can be simply assembled, as shown in FIG. 13, by inserting the heads of the mounting clips 5 from the front side of the hinge bodies 21, 31 into the rectangular openings 27, 37, respectively, and pushing in the mounting clips 5 to the back side. At this time, the mounting clips 5 easily enter into the rectangular openings 27, 37 of the hinge bodies 21, 31 by only flexing the resilient legs 51 slightly inward, and at an ingress end thereof, the stepped regions 54 abut against the inner peripheral regions 25, 35 of the hinge bodies 21, 31, respectively, and the retaining pawls 55 are retained by the holding regions 26, 36 of the hinge bodies 21, 31, respectively. Thus, the mounting clips 5 are securely positioned at predetermined positions of the hinge bodies 21, 31, which prevent the mounting clips 5 from slipping toward the front side when inserting the mounting clips 5 into rectangular holes of the body panel of a vehicle body, and allows satisfactorily assembling and securing the mounting clips 5. Subsequently, the hinge body 21 is located at a predetermined position in the hinge cavity 11 with the torsion coil spring 6 placed between the inner support 22 and the outer support 23 of the right hinge body 21, the pivot shaft 15 is inserted into the shaft hole 13 from the outside of the hinge cavity 11, and then penetrated through the torsion coil spring 6 from the shaft hole 23a of the outer support 23, and the pivot shaft 15 is further inserted through the shaft hole 22a of the inner support 22, and then the leading end of the pivot shaft 15 is inserted into the other shaft hole 13, whereby the hinge body 21 is pivotally supported relative to the grip body 1. At this time, the first end segment 61 of the torsion coil spring 6 is retained by a part of the hinge body 21, and the second end segment 62 is held in the periphery of the hinge cavity 11 of the grip body 1, so that the hinge body 21 is biased toward the hinge cavity 11 due to a spring force of the torsion coil spring 6 to enter into the hinge cavity 11.

Similarly, in the left hinge body 31, the hinge body 31 is located at a predetermined position in the hinge cavity 12 with the oil damper 8 interposed between the inner support 32 and the outer support 33, the pivot shaft 16 is inserted into the shaft hole 14 of the hinge cavity 12 from the outside, and then penetrated through the oil damper 8 from the shaft hole 33a of the outer support 33, and the pivot shaft 16 is further inserted through the shaft hole 32a of the inner support 32, and then the leading end of the pivot shaft 16 is inserted into the other shaft hole 14, whereby the hinge body 31 is pivotally supported relative to the grip body 1. At this time, the oblong boss 84 of the oil damper 8 fits in the oblong boss recessed region 32b at the inner side of the inner support 32, and the linear protrusion 85 on the outer tube of the oil damper 8 is held by the linear protrusion engaging portion 12a of the hinge cavity 12 of the grip body 1, so that rotational resistance is exerted to the hinge body 31 due to viscosity resistance of the oil of the oil damper 8.

Thereafter, the covers 4 are provisionally mounted to the front of the hinge bodies 21, 31, respectively. Each cover 4 is provisionally mounted in such a manner as inserting the clip support portion 42 provided in a projecting manner on the back side of the cover 4 up to an intermediate position in the rectangular opening 27, 37 of the hinge body 21, 31. When the mounting clips 5 are fitted into the rectangular holes of the body panel, the covers 4 are thus mounted at the front side of the hinge bodies 21, 31 in a provisionally mounted state where the resilient bulging portions 52 and the like of the mounting clips 5 are movable.

Figure 14:
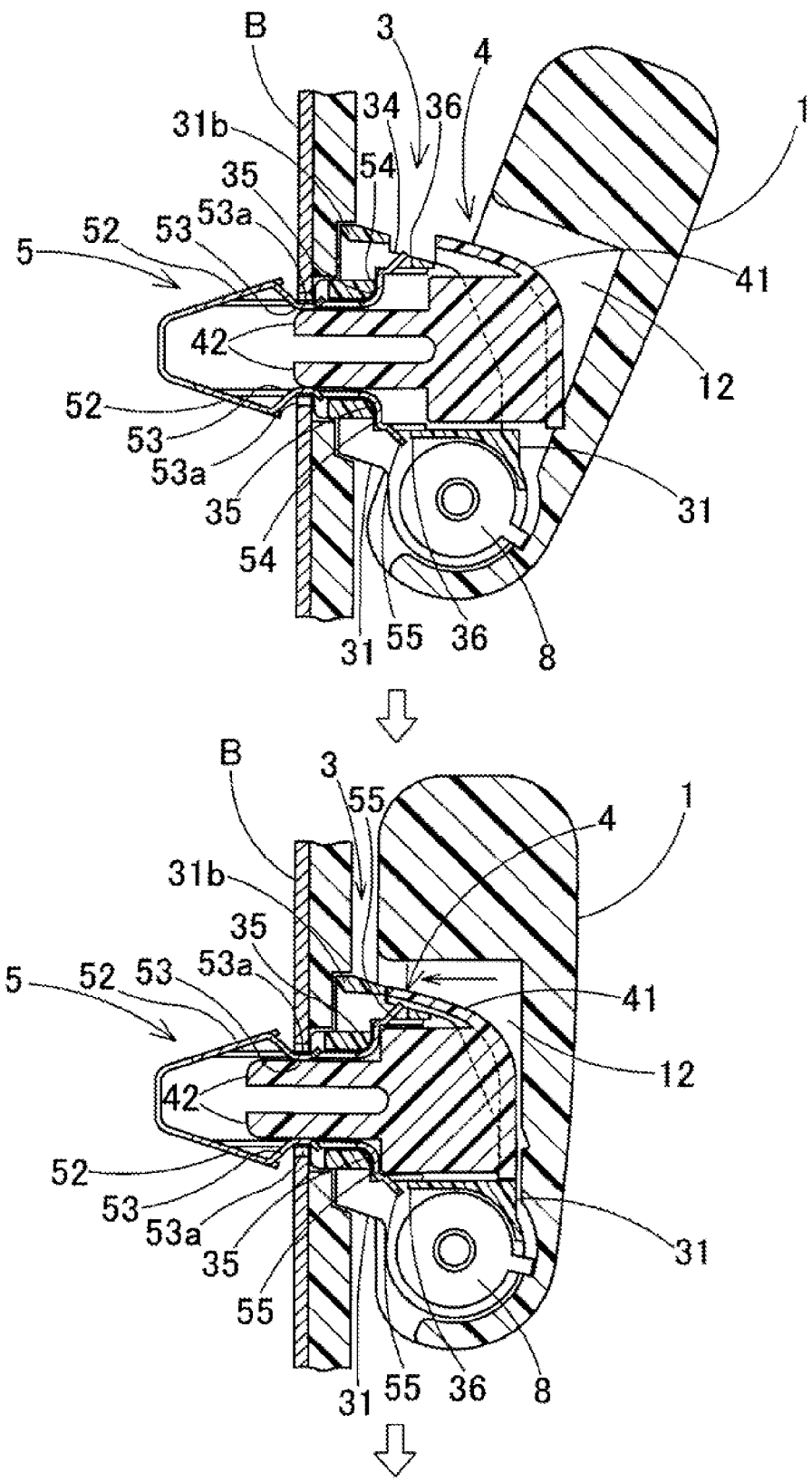
FIG. 14 is a diagram illustrating the mounting of the assist grip on a vehicle body panel by sectional views.

When the assist grip is mounted at a predetermined location in a vehicle compartment, the hinge assemblies 2, 3 located at opposite bases of the assist grip are pushed into rectangular holes formed on a molded ceiling covering and body panel B of the vehicle as shown in FIG. 14. At this time, the resilient bulging portions 52, 52 of the mounting clips 5, 5 provided on both of the hinge bodies 21, 31 abut against peripheries of the rectangular holes and elastically deform inward while entering into the rectangular holes, and when the resilient bulging portions 52, 52 of the mounting clips 5, 5 are completely inserted into the rectangular holes, the peripheries of the rectangular holes of the body panel B are clamped and retained between the recess portions 53a of the retention portions 53, 53 of the resilient bulging portions 52, 52 and the seat portions 21b, 31b formed at the leading ends of the hinge bodies 21, 31.

When the mounting clips 5 of the hinge assemblies 2, 3 are fitted into the rectangular holes of the body panel B, the mounting clips 5 are subjected to a load acting in a direction to remove the clips due to reaction force from the body panel B on the front side of the hinge assemblies 2, 3 (lower side in FIG. 13), but the load is supported by the retaining pawls 55 formed at the leading ends of the resilient legs 51 of the mounting clips 5 being retained by the holding regions 26, 36 of the hinge bodies 21, 31 as shown in FIG. 14. Accordingly, when fitting the mounting clips 5 into the rectangular holes of the body panel B, the mounting clips 5 are securely fastened on the peripheries of the rectangular holes of the body panel without slippage and thus the hinge assemblies 2, 3 are simply and tightly secured to the vehicle body panel B.

Thereafter, the covers 4, 4 assembled provisionally are pushed into interiors of the hinge bodies 21, 31 such that the engaging pawls 43 formed at the inner side thereof engage with the cover engaging portions 29, 39 located on both sides of the hinge bodies 21, 31. In this state, as shown in FIG. 14, the clip support portions 42, 42 of the covers 4, 4 completely fit in the interiors of the mounting clips 5, 5 which makes the mounting clips 5, 5 be tightly secured to mounting locations of the vehicle body and completes the mounting of the assist grip.

As has been described, when attaching the mounting clips 5, 5 to the hinge bodies 21, 31, the mounting clips 5, 5 can be simply assembled thereto by being inserted into the rectangular openings 27, 37 from the front side of the hinge bodies 21, 31, and in the assembled state, the retention of the retaining pawls 55, 55 by the holding regions 26, 36 as well as the retention of the stepped regions 54, 54 of the resilient legs 51, 51 at both sides by the inner peripheral regions 25, 35 of the rectangular openings 27, 37 fasten the mounting clips 5, 5 to the hinge bodies 21, 31 in a stable manner, even without a center support plate provided in a projecting manner in the rectangular opening in prior designs of the hinge assembly.

Accordingly, an operator no longer has to press resilient legs 51, 51 forcefully against spring resiliency to attach the mounting clips 5, 5 to the hinge bodies 21, 31, but can easily assemble the mounting clips 5, 5 to the hinge bodies 21, 31 from the front side of the hinge assemblies 2, 3. Not having to press the resilient legs 51, 51 forcefully against spring resiliency for assembly also reduces the fear of deterioration in resiliency of the resilient legs 51 of the mounting clips 5 and breakage of the resilient legs 51. Moreover, since the rectangular opening of the hinge body is wholly open without a center support plate provided in a projecting manner which was required in the prior designs of the hinge assembly, the structures of the molds for the hinge bodies 21, 31 will be simplified and thus reducing the cost for manufacturing an assist grip.

Furthermore, when attaching the mounting clips 5 to the hinge bodies 21, 31, the mounting clips 5 easily enter into the rectangular openings 27, 37 of the hinge bodies 21, 31 by only flexing the resilient legs 51 slightly inward and, at the ingress end thereof, the stepped regions 54 abut against the inner peripheral regions 25, 35 of the hinge bodies 21, 31, respectively, and the retaining pawls 55 are retained by the holding regions 26, 36 of the hinge bodies 21, 31, respectively, and thus the mounting clips 5 are securely positioned at predetermined positions of the hinge bodies 21, 31, which prevents the mounting clips 5 from slipping toward the front side when inserting the mounting clips 5 into rectangular holes of the body panel B, and allows satisfactorily assembling and securing the mounting clips.

For using the assist grip, a user rotates the grip body 1 to the lower side about the hinge assemblies 2, 3 to use the assist grip as shown in FIG. 2. The grip body 1 is pulled downward at its central region by the user, and at this time, the torsion coil spring 6 is twisted at the second end segment 62 against its torsion spring force by a rotation of the holding recess 11a of the hinge cavity 11 in the grip body 1. Thus the grip body 1 rotates to the lower side against the torsion spring force, and the grip body 1 is kept in an in-use state by the user gripping the grip body 1.

When the user releases his/her hand from the grip body 1 in an in-use state of the assist grip, the grip body 1 rotates upward due to an upward (clockwise, in FIG. 2) biasing force exerted by the second end segment 62 of the torsion coil spring 6 and returns into a non-use state (the position indicated by solid lines in FIG. 2), and at this time, the oil damper 8 acts to brake the rotation of the grip body 1, so that the grip body 1 returns to the non-use position at low speed.

Figure 15:
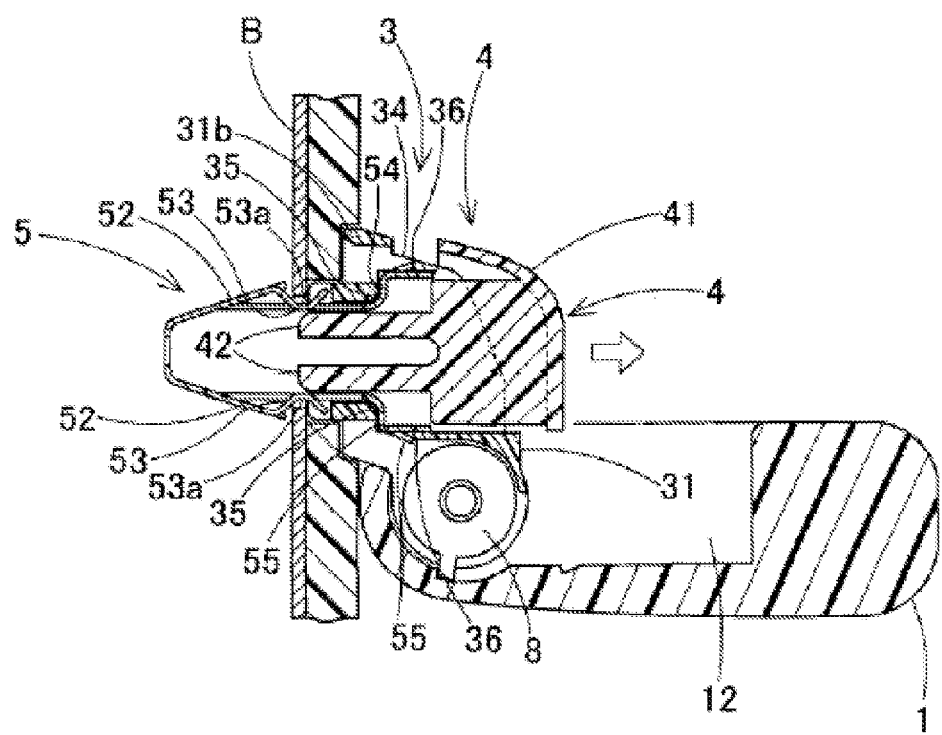
FIG. 15 is a diagram illustrating the demounting of the assist grip from the vehicle body panel by a sectional view.
Figure 16:
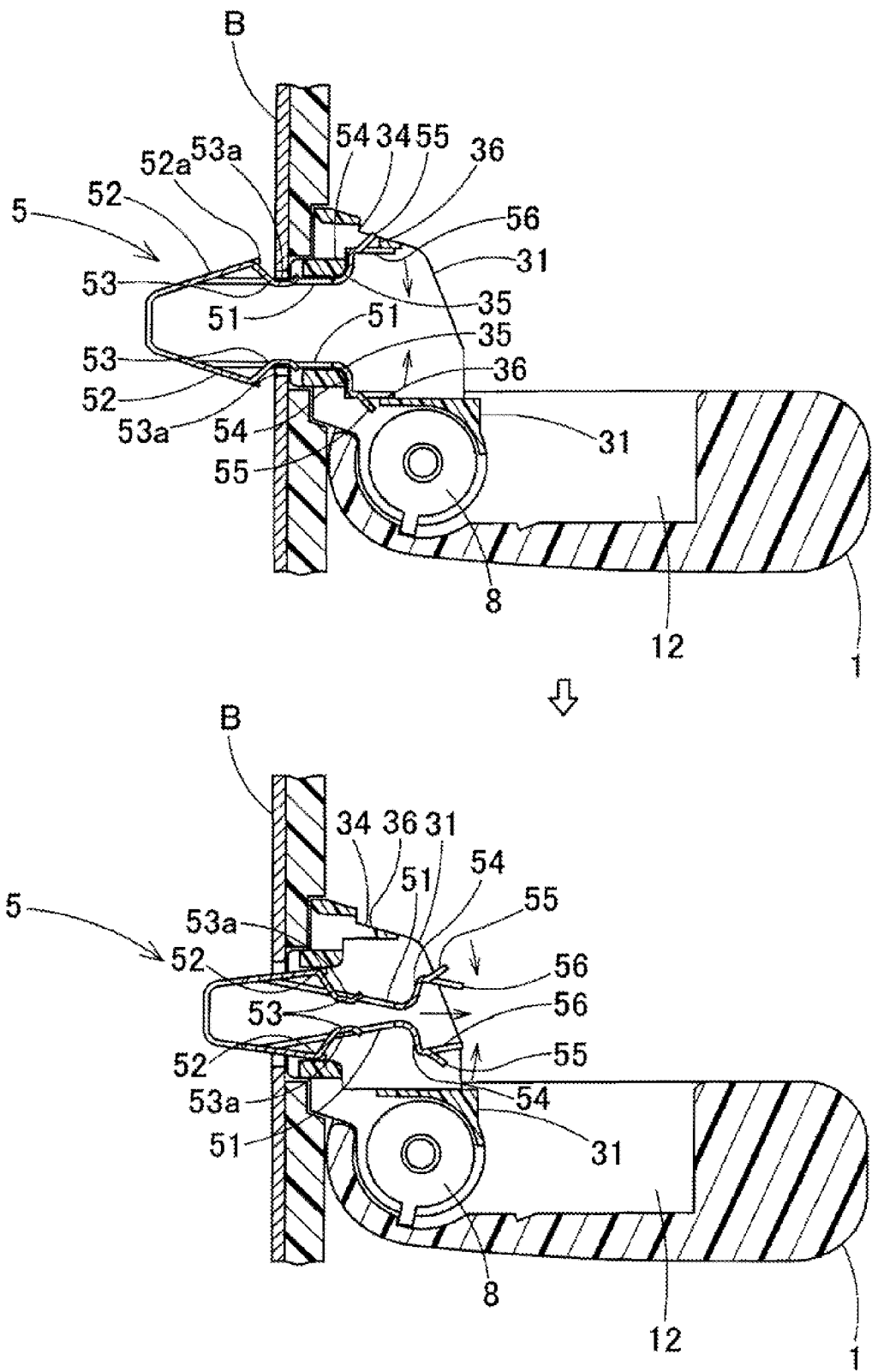
FIG. 16 is a diagram illustrating the demounting of the assist grip from the vehicle body panel by sectional views.

On the other hand, when the assist grip is demounted from the vehicle body for repair and the like, first, as shown in FIG. 15, an operator having rotated the grip body 1 to the lower side removes the cover 4 by pulling it to the nearer side from the hinge body 21, 31. Specifically, an operator inserts a tool or the like into a gap between the cover 4 and the hinge body 21, 31 to disengage the engaging pawls 43, 43 of the cover 4 from the cover engaging portions 29, 39 provided at both sides of the hinge body 21, 31, and removes the cover 4 by pulling it to the nearer side. In this state, as shown in FIG. 16, the operator gets sight of the interiors of the hinge bodies 21, 31 from the front, and flexes not only the leading end portions of the resilient legs 51 provided at both sides of the mounting clip 5 but also the retention portions 53, 53 of the resilient bulging portions 52, 52 inward by means of a tool or the like.

At this time, since the mounting clip 5 includes the recess portions 53*a* with extended regions 53*b* in the retention portions 53 of the resilient bulging portions 52 provided at both sides of the mounting clip 5, the extended regions 53*b* make the retention portions 53 longer in length than laid V-shaped retention portions in prior designs of the mounting clip and be located at the nearer side. Accordingly, the operator can easily observe the retention portions 53 of the mounting clips 5 in the hinge bodies 21, 31, and can easily catch a tool or the like on the leading ends of the resilient legs 51 at both sides and the leading ends of the retention portions 53 of the resilient bulging portions 52 at both sides so as to remove the mounting clip 5. Thus, when demounting the assist grip, the operator can easily flex the resilient bulging portions 52 inward by a tool or the like to disengage the recess portions 53*a* the retention portions 53 of the mounting clip 5 from the periphery of the rectangular hole of the body panel, and easily remove the hinge body 21, 31 of the assist grip from the vehicle body.

Figure 17A:
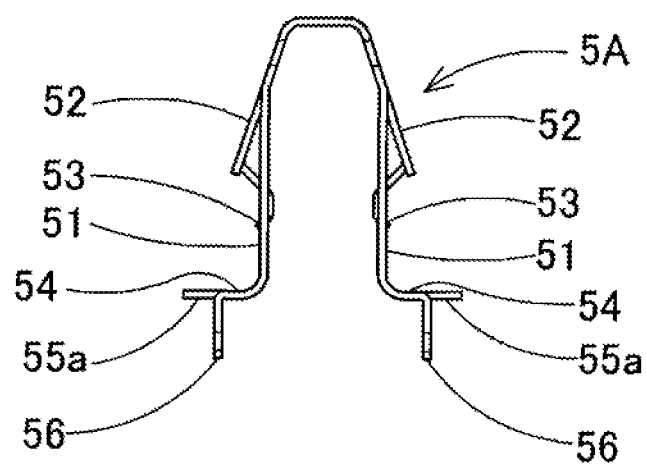
FIG. 17A is a side view of a mounting clip of another embodiment.
Figure 17B:
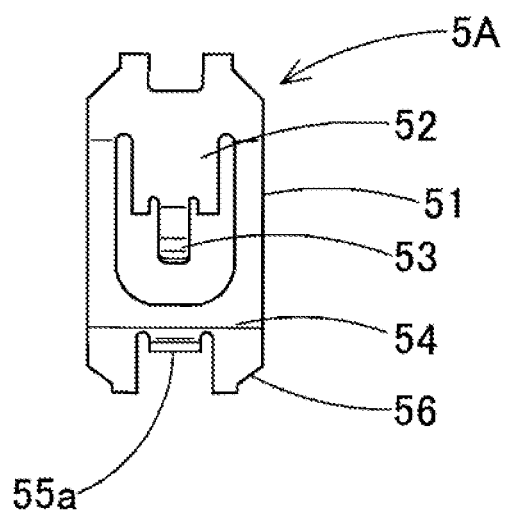
FIG. 17B is a plan view of the mounting clip.

FIG. 17A and FIG. 17B show a mounting clip 5A of another embodiment. The same parts as those of the above-described mounting clip 5 are denoted by the same reference signs as above in FIG. 17A and FIG. 17B, and description thereof is omitted.

In the mounting clip 5A, as shown in FIG. 17A and FIG. 17B, each of the resilient legs 51 at both sides includes a stepped region 54 formed in the vicinity of the leading end and bent substantially perpendicular to the leg, and includes at the leading end side of the stepped region 54 a projecting portion 56 extended substantially in parallel to the inserting direction of the mounting clip 5, that is, substantially in parallel to the resilient leg 51 and divided into three regions, which defines a leading end portion. The projecting portion 56 includes a central part as a retaining pawl 55*a* formed in a projecting manner by being cut and raised so as to project outward. As shown in FIG. 17A and FIG. 17B, the retaining pawl 55*a* is provided in a projecting manner so as to project both sides in parallel to the plane of the stepped region 54, that is, in a direction perpendicular to the inserting direction of the mounting clip 5 (longitudinal direction of the resilient leg 51).

Therefore, when assembling the mounting clip 5A to the hinge body 31, the head of the mounting clip 5A is inserted into the rectangular opening 37 of the hinge body 31 from the front side, and the mounting clip 5A is then pushed up to the insertion end, and at this time, the stepped regions 54 at both sides of the mounting clip 5A are retained by the inner peripheral regions 35 provided at both sides of the rectangular opening 37. The flat retaining pawls 55*a* at both sides enter the holes 34 at both sides in the rectangular opening 37 of the hinge body 31, and abut against the flat holding regions 36 formed at the front side of the holes 34 to be thereby held.

Accordingly, when mounting the assist grip by inserting the hinge assemblies 2, 3 of the hinge bodies 21, 31 with the mounting clips 5A into rectangular holes provided in a vehicle body panel, respectively, the retaining pawls 55*a* are not deformed when the mounting clip 5A is inserted into the rectangular hole, and reaction force of the mounting clip 5A generated when the mounting clip 5A is pushed in is satisfactorily retained by the holding regions 36 against which the retaining pawls 55*a* abut. Accordingly, the hinge bodies 21, 31 can be uniformly secured at appropriate positions to a vehicle body panel. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An assist grip comprising:
    a grip body including hinge cavities on bases at a left end and a right end that is opposite the left end;
    hinge assemblies including a pair of hinge bodies that are configured to pivotally connect to the hinge cavities at opposite sides via pivot shafts; and
    mounting clips respectively inserted into rectangular openings in the pair of hinge bodies, each of the mounting clips comprising:
        a pair of resilient legs formed into a substantially U-shape and having spring resiliency;
        a resilient bulging portion that bulges outward in each of the resilient legs at both sides;
        a retention portion in a vicinity of a leading end of each of the resilient bulging portions at both sides and bent inward, and when the assist grip is mounted on a vehicle body, and configured to be retained by a mounting location of the vehicle body; and
        a stepped region in a vicinity of a leading end of the resilient leg, and configured to be retained by an inner peripheral region of the rectangular openings of the pair of hinge bodies,
    wherein the retention portion of the resilient bulging portion includes a recess portion recessed inward and provided with an extended region in a pull-out direction of the mounting clips.

2. The assist grip according to claim 1, wherein each of the resilient bulging portions provided at both sides of the mounting clips includes short retaining pawls provided in a projecting manner that is substantially parallel to a plane of the resilient bulging portion on both sides of the retention portion.

3. The assist grip of claim 2, wherein the short retaining pawls of the resilient bulging portion, when the assist grip is mounted on the vehicle body, are configured to be retained by an inner side of the mounting location of the vehicle body.

4. The assist grip according to claim 1, wherein the stepped region of the resilient leg is bent into a substantially crank shape.

5. The assist grip according to claim 4, wherein the stepped region includes, at a leading end side, a projecting portion divided into three regions.

6. The assist grip according to claim 5, wherein the projecting portion at a center is provided as a retaining pawl to project outward in an inclined manner.

7. The assist grip according to claim 6, wherein the retaining pawl of the resilient leg, when the mounting clips is inserted into the pair of hinge bodies, is configured to be retained by a holding region of the pair of hinge bodies.

8. The assist grip according to claim 5, wherein the projecting portion at a center is provided as a retaining pawl to project outward in parallel to a plane of the stepped region.

9. The assist grip according to claim 8, wherein the retaining pawl of the resilient leg, when the mounting clips is inserted into the pair of hinge bodies, is retained by a holding region of the pair of hinge bodies.

* * * * *